United States Patent

Takao et al.

[11] 3,899,555
[45] Aug. 12, 1975

[54] METHOD OF PREPARING CERAMIC STRUCTURES

[75] Inventors: Hiroshi Takao, Yokosuka; Kinmochi Togawa, Tokyo; Satoshi Abe; Sigeyosi Nakagawa, both of Yokosuka, all of Japan

[73] Assignee: Nissan Motor Company Limited, Japan

[22] Filed: Dec. 27, 1971

[21] Appl. No.: 212,019

[30] Foreign Application Priority Data

Jan. 13, 1971   Japan.................................... 46-678

[52] U.S. Cl. .................. 264/44; 161/205; 162/152; 162/155; 264/59; 264/63; 264/81; 264/87
[51] Int. Cl............................................. B29h 7/20
[58] Field of Search ............ 264/59, 63, 86, 87, 44; 161/205; 162/152, 155

[56] References Cited
UNITED STATES PATENTS

| | | | |
|---|---|---|---|
| 2,875,501 | 3/1959 | Gravley | 264/59 |
| 3,133,133 | 5/1964 | Fairbanks | 264/59 |
| 3,162,607 | 12/1964 | Burbidge et al. | 264/59 |
| 3,240,663 | 3/1966 | Raczek | 162/152 |
| 3,251,403 | 5/1966 | Smith | 264/59 |
| 3,275,497 | 9/1966 | Weiss et al. | 264/59 |
| 3,533,753 | 10/1970 | Berger | 264/59 |
| 3,705,223 | 12/1972 | Pearson et al. | 264/56 |

FOREIGN PATENTS OR APPLICATIONS

| | | | |
|---|---|---|---|
| 626,559 | 8/1961 | Canada | 264/59 |
| 931,096 | 7/1963 | United Kingdom | |

*Primary Examiner*—Melvyn I. Marquis
*Assistant Examiner*—William E. Parker
*Attorney, Agent, or Firm*—Robert E. Burns; Emmanuel J. Lobato; Bruce L. Adams

[57] ABSTRACT

A method of preparing a porous ceramic structure having a multiplicity of voids or pores of small size randomly distributed therein. The method comprises the steps of dispersing in a liquid such as water a ceramic material in powder form and/or in short-cut fiber form together with combustible organic fibers in short-cut form to obtain a suspension containing the ceramic material and the organic fibers, making a sheet of ceramic-dispersed paper of the suspension, and baking the resultant sheet of ceramic-dispersed paper for sintering the ceramic dispersed therein and burning out the organic fibers dispersed therein. The obtained ceramic structure has a sufficient rigidity and a wide effective surface area so that it finds a wide variety of applications for example, as a heat exchanger element, a catalyst carrier and a radiator element.

5 Claims, 1 Drawing Figure

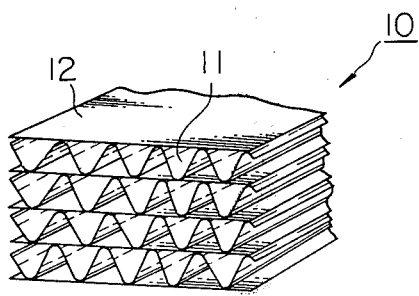

METHOD OF PREPARING CERAMIC STRUCTURES

The present invention relates to a method of preparing a ceramic structure consisting largely of small size voids or pores randomly distributed therein.

Conventional methods for fabricating ceramics structures consist of the steps of depositing a powdered ceramic material together with a suitable binder on flexible carriers to form carriers covered with the ceramic material and binder, shaping the carrier into corrugated plates, forming an article of a desired shape by combining the corrugated and flat plates, and sintering the article containing the ceramic to produce a ceramic structure of the desired shape. For convenience of discussion, this method will later be referred to as "Hollenbach Method." In short, the conventional method is characterized by the step of depositing a powdered ceramic material on a flexible carrier to form a carrier covered with the ceramic material. Then, the flexible carrier is burned out during the sintering step to leave a hollow ceramic structure composed of corrugated and flat plates.

The present invention provides a method of preparing a ceramic structure, which method is characterized in that a ceramic material in powder form and/or in short-cut fiber form is dispersed in a liquid together with liquid-insoluble combustible organic fibers in short-cut form to make a suspension. More specifically, organic fibers in short-cut form are at first dispersed thoroughly in a suitable liquid such as water to prepare a suspension. If desired, a suitable binder may be added to the suspension after the dispersing step and a suitable dispersing agent may also be added to the final suspension containing the ceramics material and the organic fibers. After sufficient agitation of the final suspension as a whole, a sheet of paper containing the ceramic material and the organic fibers is made of the final suspension on a wire mesh. This sheet of paper will be called hereinafter "a ceramic-dispersed paper." After full or partial drying, the ceramic-dispersed paper is shaped into a desired form. The shaped ceramic-dispersed paper is then baked to sinter the ceramic content thereof, thus producing a ceramics structure of the desired form.

The accompanying drawing is a perspective view illustrating a ceramic structure of honeycomb shape prepared by the method according to the present invention.

A suitable liquid for this method is usually water, into which a suitable water repellent such as rosin may be added, if desired. The addition of the water repellent is highly effective in avoiding deformation after shaping due to water or moisture absorptivity of the ceramic-dispersed paper. If, however, a ceramic structure of large size is intended to be prepared, the ceramic-dispersed paper is often subject to shrinkage during the sintering step. This deterioration of dimensional stability is found excessive when a ceramic material such as cordierite is used. In this instance, however, dimensional stability can be improved if an organic liquid such as toluene or benzine is used in place of water.

A suitable binder is found to improve flexibility of the ceramic-dispersed paper. Therefore, the addition of such binder is effective in preventing the ceramic-dispersed paper from cracking during the sintering step, especially when a ceramic structure of complicated construction is to be prepared. In this method, polyvinylalcohol, gum arabic, rosin or other natural or synthetic resin can be used as a binder.

In the method of the invention, the powder size of the ceramic material may have any value if the suspension can be used to make paper. Therefore, a variety of ceramic materials can be selected, as the case may be, including silicate, alumina cordierite, spodumene, zirconia, magnesia, titania and the like, and any combination thereof. For obtaining a rigid ceramic structure, however, it is preferred that the ceramic material contains a silicate which has a low melting point.

In this method, a dispersing agent may be added into the suspension containing the ceramic material and the organic fibers so as to uniformly disperse the ceramic material in the suspension and thereby to obtain the ceramic-dispersed paper. A material suitable for this dispersing agent is, for example, water glass, hydrochloric acid or sodium hydroxide.

The invention will be illustrated by way of examples, but they are presented merely for descriptive purposes. Therefore, the scope of the invention should not be restricted only to the embodiments, as follows.

EXAMPLE I

Materials:
Clay as a ceramic material ($SiO_2$, $Al_2O_3$, a small quantity of other metal oxides) . . . 0.5 – 5 wt%
Cellulose as organic fibers (conifer pulp, unbleached) . . . 0.05 – 0.3 wt%
Water as a liquid . . . the remaining wt%

The above clay was prepared by sieving crude clay through a sieve of 325 mesh. The above pulp was prepared by beating pulp to an extent to have a sufficient bonding strength.

At first, the above materials were sufficiently agitated to prepare a suspension of the clay and the cellulose. This suspension was made into a sheet of ceramic-dispersed paper of 0.1 – 1.0 mm thickness on a wire screen of 120 mesh (200$\phi$mm, 300 cm$^2$). After a drying step performed at 120°C, the resultant paper was cut into a rectangular form. Then, this rectangular paper was shaped to have a cylindrical form of a suitable diameter or to have a corrugated form. This shaped paper was thereafter piled up on an unshaped flat paper, which was separately prepared, repeating the piling up to form a honeycomb structure.

This honeycomb structure 10 is shown in the accompanying drawing, with the corrugated paper 11 and the unmoulded flat paper 12 respectively designated.

After the piling step, the honeycomb structure 10 was baked for 2 hours at a temperature of 1,200° – 1,300°C to sinter the ceramic material of the honeycomb structure 10. Although the final honeycomb structure consists largely of pores of interstices randomly distributed therein as a result of the cellulose content having burned out during the baking step, its original shape before this particular step was maintained and the mechanical strength thereof was comparable to that of the structure of the same shape made of solid baked clay.

EXAMPLE II

Materials:

| Powdered ceramic | { $\alpha$—$Al_2O_3$ | 0.5 – 5 wt% |
| | { bentonite | 0.01 – 0.5 wt% |
| Cellulose (conifer pulp, unbleached) | | |

| | |
|---|---|
| -Continued | 0.05 – 0.3 wt% |
| Water | the remaining wt% |

The ceramic-dispersed paper prepared in a similar manner to the Example I was baked in this Example for 4 hours at a temperature of 1,300° – 1,500°C. The resultant ceramic structure could also maintain its original shape and was excellent in its rigidity, in either case where it was of honeycomb shape or of cylindrical shape.

EXAMPLE III

Cordierite and hemp pulp were prepared in the same manner as described in Example I. About 4 % by weight of cordierite and about 0.8 % by weight of hemp pulp were dispersed in water on a large scale together with a suitable amount of pH modulator. Then, a web of ceramic-dispersed paper was produced on a Fourdrinier paper making machine(wire mesh No. 80). The resultant paper sheet was 0.3 – 0.4 mm thick and had specific gravity 0.9 – 1.0. The ceramic-dispersed paper contained a mixture of the cordierite and the organic substance in the weight ratio of 10 – 15 : 1.

Then the ceramic-dispersed paper was formed into a single faced corrugated board by means of a corrugator, wherein a vinyl acetate emulsion was used as an adhesive. The single faced corrugated board thus obtained was 300 mm wide, 50 pitches/30cm, and 3mm high. Furthermore, the single faced corrugated board was formed into a cylindrically shaped structure, which was 120mm in diameter and 300 mm thick, and which was set with a mixture of vinyl acetate of the adhesive type and a fine powder of ceramic similar to that used in the above-described ceramic-dispersed paper. Finally, the single faced corrugated board was sintered at 1,350°C with the result that a honeycomb-like ceramic structure was obtained which was excellent in strength and remarkably hygroscopic The features possessed by the method of the invention will be itemized in the following in comparison with the conventional Hollenbach Method.

1. In the Hollenbach Method, a binder is an indispensable material for affording flexibility to the carrier covered with the ceramic material. In the present method, on the other hand, the powdered or short cut ceramic is dispersed together with the short-cut organic fibers so that separation of the ceramic can be minimized during the process of preparing the ceramic structure. Hence, the binder may be dispensed with in the present method, even if the ceramic-dispersed paper goes through a rough folding step.

The powdered ceramic material is deposited on the overall surface of the flexible carrier according to the Hollenbach Method and after the carrier is burned out during the baking step, a large void is formed within the space that the carrier had previously occupied, with a resultant decrease in strength. On the other hand, the ceramic structure prepared in accordance with the present invention consists largely of pores of small size which are randomly distributed therein. This is because the ceramic content is dispersed throughout the paper together with the organic fibers, which disappear due to the burn out during the baking or sintering step. Therefore, reduction in its rigidity is remarkably well avoided.

3. According to the Hollenbach Method, the thickness of the ceramic covering is highly influenced by the water absorptivity of the carrier, so that it is difficult to control the thickness. In the present invention, however, a ceramic structure having desired thickness can be obtained by piling up a suitable number of sheets of paper.

As apparent from the foregoing discussion, the present method provides for a ceramic structure having a thin section but a wide effective surface area per unit weight. This kind of a ceramic structure finds a variety of applications especially in the automobile field, for example, as an element for a heat exchanger, a catalyst carrier for use in an afterburner and as an element for a radiator.

What is claimed is:

1. A method of preparing a ceramic structure, comprising the steps of:
    a. dispersing a mixture comprising particulate ceramic materials in powder or short fiber form together with short cellulose fibers in an aqueous medium to form a non-colloidal slurried suspension of the particulate ceramic materials and the cellulose fibers in said aqueous medium,
    b. introducing said suspension onto a wire cloth papermaking machine;
    c. draining said aqueous medium from said insoluble particulate material and fibers through said wire cloth to form a matted sheet of particulate material and cellulose fibers on said wire cloth;
    d. removing said sheet from said wire cloth to form a paper sheet in which said mixture of ceramic materials and said cellulose fibers are randomly and uniformly dispersed;
    e. drying the resultant paper sheet to remove excess water and to form a plasticized green ceramic sheet;
    f. forming said green ceramic sheet into a plasticized green honeycomb structure;
    g. baking the green honeycomb structure for a time and at a temperature sufficient for sintering the particulate ceramic materials dispersed therein, to a self-supporting honeycomb and for burning off the cellulose fibers dispersed therein, thereby leaving a porous ceramic honeycomb having its pores randomly distributed in the wall thereof.

2. A method according to claim 1, further comprising the step of adding rosin as a water repellent to said liquid before the dispersing step.

3. A method according to claim 1, further comprising the step of adding to said suspension a binder selected from the group consisting of polyvinylalcohol, gum arabic and rosin.

4. A method according to claim 1, further comprising the step of adding to said suspension a dispersing agent selected from the group consisting of water glass, hydrochloric acid and sodium hydroxide.

5. A method according to claim 1, wherein the shaping step includes the step of forming a sheet of paper into a cylindrical shape.

* * * * *